US012558898B2

(12) United States Patent
Kim et al.

(10) Patent No.: US 12,558,898 B2
(45) Date of Patent: Feb. 24, 2026

(54) CHEMICAL LIQUID REMOVING UNIT, DEVICE FOR SUPPLYING CHEMICAL LIQUID AND METHOD OF REMOVING CHEMICAL LIQUID

(71) Applicant: SEMES CO., LTD., Cheonan-si (KR)

(72) Inventors: Chulwoo Kim, Cheonan-si (KR); Beomjeong Oh, Cheonan-si (KR)

(73) Assignee: Semes Co., LTD., Cheonan-si (KR)

( * ) Notice: Subject to any disclaimer, the term of this patent is extended or adjusted under 35 U.S.C. 154(b) by 230 days.

(21) Appl. No.: 18/462,581

(22) Filed: Sep. 7, 2023

(65) Prior Publication Data

US 2024/0092082 A1 Mar. 21, 2024

(30) Foreign Application Priority Data

Sep. 20, 2022 (KR) ........................ 10-2022-0118304

(51) Int. Cl.

*B41J 2/165* (2006.01)
*B41J 2/17* (2006.01)
*B41J 29/17* (2006.01)

(52) U.S. Cl.

CPC ......... *B41J 2/16517* (2013.01); *B41J 2/1714* (2013.01); *B41J 29/17* (2013.01)

(58) Field of Classification Search

CPC ....... B41J 2/16517; B41J 2/1714; B41J 29/17
See application file for complete search history.

(56) References Cited

U.S. PATENT DOCUMENTS

| | | | | |
|---|---|---|---|---|
| 10,259,225 | B2 * | 4/2019 | Araki | B41J 2/16544 |
| 2003/0121531 | A1 * | 7/2003 | Fassler | B41J 2/16552 134/169 R |
| 2012/0120151 | A1 | 5/2012 | Ko et al. | |

FOREIGN PATENT DOCUMENTS

| | | | |
|---|---|---|---|
| JP | 2004-216642 | A | 8/2004 |
| JP | 2021126780 | A * | 9/2021 |
| KR | 100543506 | B1 | 1/2006 |
| KR | 20110002683 | A | 1/2011 |
| KR | 101080329 | B1 | 11/2011 |
| KR | 10-2012-0051119 | A | 5/2012 |
| KR | 20190118008 | A | 10/2019 |
| KR | 20210050729 | A | 5/2021 |

* cited by examiner

*Primary Examiner* — Sharon Polk
(74) *Attorney, Agent, or Firm* — Harness, Dickey & Pierce, P.L.C.

(57) ABSTRACT

A chemical liquid removing unit may remove a remaining chemical liquid from an ink jet head. The chemical liquid removing unit may include a surface tension providing part configured to remove the remaining chemical liquid from a nozzle face of the ink jet head using a surface tension, a driving part configured to move the surface tension providing part relative to the nozzle face the ink jet head, and a control part configured to control the driving part such that the surface tension providing part contacts the remaining chemical liquid whereas the surface tension providing part does not contact the nozzle face of the ink jet head.

15 Claims, 2 Drawing Sheets

CHEMICAL LIQUID REMOVING UNIT, DEVICE FOR SUPPLYING CHEMICAL LIQUID AND METHOD OF REMOVING CHEMICAL LIQUID

CROSS-REFERENCE TO RELATED APPLICATION

This application claims priority to Korean Patent Application No. 10-2022-0118304 filed on Sep. 20, 2022 in the Korean Intellectual Property Office (KIPO), the contents of which are herein incorporated by reference in its entirety.

BACKGROUND

1. Field

Example embodiments of the invention relate to a chemical liquid removing unit, a device for supplying a chemical liquid, and a method of removing a chemical liquid. More particularly, example embodiments of the invention relate to a chemical liquid removing unit capable of a remaining chemical liquid from an inkjet head, a device for supplying a chemical liquid including the chemical liquid removing unit, and a method of removing a chemical liquid using such a chemical liquid removing unit.

2. Related Technology

To manufacture a display device such as an organic light emitting display (OLED) device or a quantum dot light emitting display (QLED) device, a process of supplying a predetermined chemical liquid onto a substrate may be generally carried out. Such a process of supplying a chemical liquid may be performed on the substrate using an ink jet head including a nozzle face on which a plurality of nozzles are arranged.

If the chemical liquid remains in or on the nozzle face of the ink jet head, the chemical liquid may not properly provided onto the substrate from the ink jet head, and thus the failure of the process of supplying a chemical liquid may be caused. Considering this problem, a maintenance process may be performed on the ink jet head to remove the remaining chemical liquid from the nozzle face of the ink jet head.

In the conventional maintenance process, the remaining chemical liquid may be generally removed from the nozzle face using an absorbent paper. However, the arrangement of the ink jet head may be changed if the absorbent paper makes contact with the nozzle face while removing the remaining chemical liquid from the nozzle face. Further, the conventional maintenance process may be performed using a separately provided maintenance device so that the cost and space for the maintenance process may be increased.

SUMMARY

One aspect of the invention to provides a chemical liquid removing unit which may remove a remaining chemical liquid from a nozzle face of an inkjet head jet head in a substantial non-contact manner.

Another aspect of the invention to provides a method of removing a chemical liquid which may remove remaining chemical liquid from a nozzle face of an inkjet head jet head in a substantial non-contact manner.

Still another aspect of the invention to provides a device for supplying a chemical liquid including a chemical liquid removing unit which may remove a remaining chemical liquid from a nozzle face of an inkjet head jet head in a substantial non-contact manner.

According to an aspect of the invention, there is provided a chemical liquid removing unit. The chemical liquid removing unit may include a surface tension providing part configured to remove the remaining chemical liquid from a nozzle face of the ink jet head using a surface tension, a driving part configured to move the surface tension providing part relative to the nozzle face the ink jet head, and a control part configured to control the driving part such that the surface tension providing part contacts the remaining chemical liquid whereas the surface tension providing part does not contact the nozzle face of the ink jet head.

In example embodiments, the driving part may be configured to move the surface tension providing part in a vertical upward direction toward the nozzle face and to move the surface tension providing part in a vertical downward direction away from the nozzle face.

In some example embodiments, the driving part may be configured to move the surface tension providing part in a left direction and in a right direction relative to the nozzle face, and the control part may control the driving part such that the driving part may move to the surface tension providing part along the left direction and the right direction in a state where the surface tension providing part is positioned under the nozzle face.

In some example embodiments, the driving part may be configured to rotate the surface tension providing part relative to the nozzle face, and the control part may control the driving part such that the driving part may rotate the surface tension providing part in a state where the surface tension providing part is positioned under the nozzle face.

In some example embodiments, the chemical liquid removing unit may additionally include a hydrophilicity reinforcing part configured to increase a hydrophilicity of the surface tension providing part. The hydrophilicity reinforcing part may be configured to provide an oxygen plasma coating to the surface tension providing part or to provide a titanium oxide coating to the surface tension providing part.

In some example embodiments, the control part may be configured to control the driving part such that the surface tension providing part may be positioned under the nozzle face after the hydrophilicity reinforcing part increases the hydrophilicity of the surface tension providing part.

According to another aspect of the invention, there is a method of removing a remaining chemical liquid from an ink jet head provided. The method may include disposing a surface tension providing part under a nozzle face of the ink jet head, and removing the remaining chemical liquid from the nozzle face of the ink jet head. The surface tension providing part may contact the remaining chemical liquid whereas the surface tension providing part may not contact the nozzle face of the ink jet head.

In some example embodiments, the method may additionally include moving the surface tension providing part in a left direction or a right direction relative to the nozzle face.

In some example embodiments, the method may additionally include rotating the surface tension providing part relative to the nozzle face.

In some example embodiments, the method may additionally include increasing the hydrophilicity of the hydrophilicity reinforcing part wherein the surface tension providing part may be placed under the nozzle face after the hydrophilicity of the hydrophilicity reinforcing part is increased. The increasing of the hydrophilicity of the hydrophilicity reinforcing part may include providing an oxygen plasma coating or a titanium oxide coating on the surface tension providing part.

According to still another aspect of the invention, there is a device for supplying a chemical liquid provided. The device for supplying a chemical liquid may include a printing unit including an ink jet head configured to provide a chemical liquid onto a substrate, and at least one chemical liquid removing unit configured to remove a remaining chemical liquid from the ink jet head. The at least one chemical liquid removing unit may include a surface tension providing part configured to remove the remaining chemical liquid from a nozzle face of the ink jet head using a surface tension, a driving part configured to move the surface tension providing part relative to the nozzle face the ink jet head, and a control part configured to control the driving part such that the surface tension providing part contacts the remaining chemical liquid whereas the surface tension providing part does not contact the nozzle face of the ink jet head.

In example embodiments, the device for supplying a chemical liquid may comprises one chemical liquid removing unit disposed adjacent to one side of the printing unit, or two chemical liquid removing units disposed adjacent to both sides of the printing unit In some example embodiments, the driving part may be configured to move the surface tension providing part in a vertical upward direction toward the nozzle face and move the surface tension providing part in a vertical downward direction away from the nozzle face.

In some example embodiments, the driving part may be configured to move the surface tension providing part in a left direction and in a right direction relative to the nozzle face, and the control part controls the driving part such that the driving part may move to the surface tension providing part along the left direction and the right direction in a state where the surface tension providing part is positioned under the nozzle face.

In some example embodiments, the driving part may be configured to rotate the surface tension providing part relative to the nozzle face, and the control part controls the driving part such that the driving part may rotate the surface tension providing part in a state where the surface tension providing part is positioned under the nozzle face.

In some example embodiments, the device for supplying a chemical liquid may additionally include a hydrophilicity reinforcing part configured to increase a hydrophilicity of the surface tension providing part. The hydrophilicity reinforcing part may be configured to provide an oxygen plasma coating to the surface tension providing part or to provide a titanium oxide coating to the surface tension providing part.

In some example embodiments, the control part may be configured to control the driving part such that the surface tension providing part may be positioned under the nozzle face after the hydrophilicity reinforcing part increases the hydrophilicity of the surface tension providing part.

According to example embodiments, the remaining chemical liquid may be removed from the nozzle face of the ink jet head in substantial non-contact manner. Therefore, the failure of the process performed using the ink jet head may be reduced or avoided, and also the reliability of the process may be improved. As a result, desired layer and/or desired patterns may be accurately formed on the substrate and the reliability of the display device including the substrate may be enhanced.

BRIEF DESCRIPTION OF THE DRAWINGS

Example embodiments will be more clearly understood from the following detailed description taken in conjunction with the accompanying drawing. The following figures represent non-limiting, example embodiments as described herein.

DESCRIPTION OF EMBODIMENTS

Figure 1:
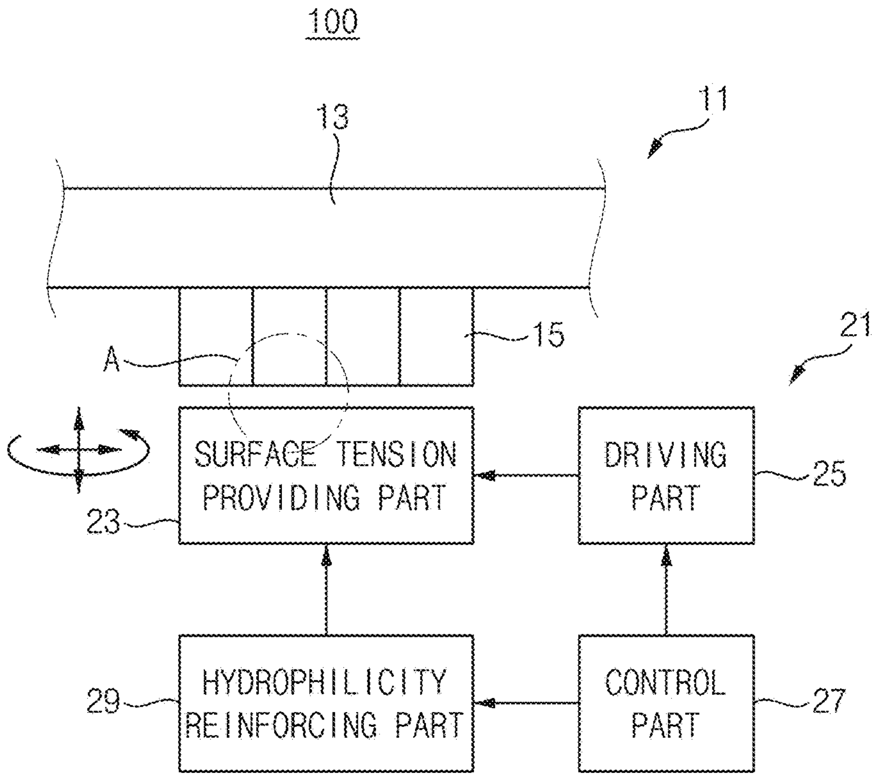
FIG. 1 is a schematic diagram illustrating a device for supplying a chemical liquid including a unit for removing the chemical liquid in accordance with example embodiments of the invention.

Various embodiments will be described more fully hereinafter with reference to the accompanying drawings, in which some embodiments are shown. The invention may, however, be embodied in many different forms and should not be construed as limited to the embodiments set forth herein. Rather, these embodiments are provided so that this description will be thorough and complete, and will fully convey the scope of the invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (for example, rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include a plurality of forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-sectional illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the face through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, it will be described example embodiments of the invention with reference to the accompanying drawings.

Figure 2:
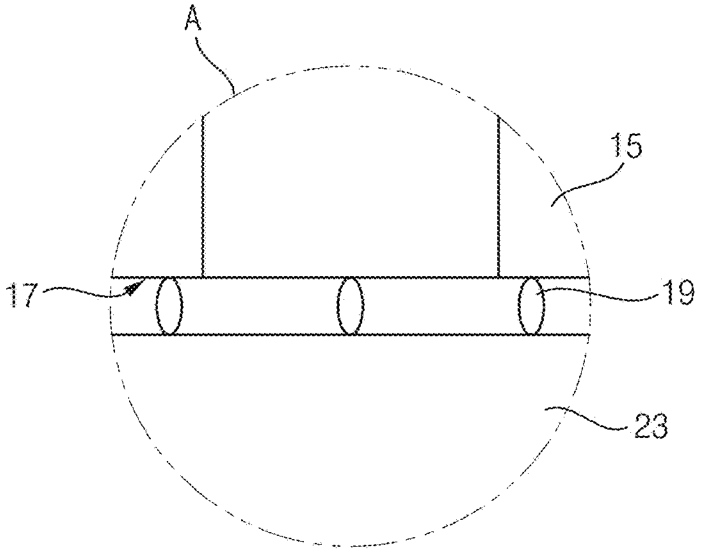
FIGS. 2 and 3 are schematic cross-sectional views illustrating removing a chemical liquid from an inkjet head.
Figure 3:
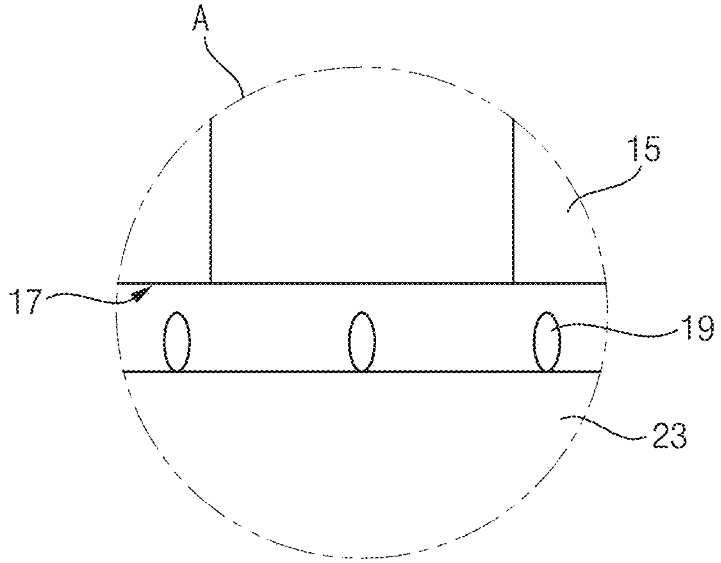

FIG. 1 is a schematic diagram illustrating a device for supplying a chemical liquid including a unit for removing the chemical liquid in accordance with example embodiments of the invention. FIGS. 2 and 3 are schematic cross-sectional views illustrating removing a chemical liquid from an inkjet head. FIGS. 2 and 3 are enlarged views of portion 'A' of FIG. 1.

Referring to FIG. 1 to 3, a device for supplying a chemical liquid 100 according to example embodiments may include a printing unit 11 and a chemical liquid removing unit 21. In this case, the printing unit 11 may be used in a process of providing a desired chemical liquid onto a substrate. The printing unit 11 may include an inkjet head 15 and a gantry 13 capable of supporting the inkjet head 15.

The device for supplying a chemical liquid 100 may be generally employed in a process of forming predetermined patterns on a substrate to manufacture a semiconductor device or a display device. Additionally, the chemical liquid removing unit 21 may remove a chemical liquid 19 remaining on and/or in a nozzle face 17 of the inkjet head 15 of the printing unit 11 in the process of forming the predetermined patterns on the substrate.

In example embodiments, the ink jet head 15 may be used in the processes for manufacturing a display device such as an organic light emitting display device (OLED), a quantum dot light emitting display device (QLED), etc. For example, the ink jet head 15 may provide the chemical liquid 19 including a red (R) ink, a green (G) ink, a blue (B) ink, or a photoresist onto a substrate. In some example embodiments, the printing unit 11 may include a plurality of ink jet heads 15 provided by the unit of pack. In this case, each of the plurality of ink jet heads 15 may include the nozzle face 17 on which a plurality of nozzles may be arranged by predetermined distances.

During the process for providing the chemical liquid onto the substrate using the device for supplying a chemical liquid 100, a proper amount of the chemical liquid 19 may not be supplied onto the substrate if the chemical liquid 19 remains on and/or in a nozzle face 17 of the inkjet head 15. In other words, the failures of the nozzles may be caused due to the chemical liquid 19 remaining on and/or in a nozzle face 17. Considering such problems, the device for supplying a chemical liquid 100 may include the chemical liquid removing unit 21 which may remove the remaining chemical liquid 19 from the nozzle face 17 of the ink jet head 15. That is, the chemical liquid removing unit 21 may perform a maintenance process on the ink jet head 15.

In example embodiments, the chemical liquid removing unit 21 of the device for supplying a chemical liquid 100 may remove the remaining chemical liquid 19 from the nozzle face 17 of the ink jet head 15 in a substantial non-contact manner. To this end, the chemical liquid removing unit 21 may include a surface tension providing part 23, a driving part 25, a hydrophilicity reinforcing part 29, a control part 27, etc.

The surface tension providing part 23 of the chemical liquid removing part 21 may remove the remaining chemical liquid 19 from the nozzle face 17 utilizing a predetermined surface tension relative to the chemical liquid 19. For example, the surface tension providing part 23 may include a blotter.

In some example embodiments, the chemical liquid removing unit 21 may remove the remaining chemical liquid 19 from the nozzle face 17. For example, the chemical liquid removing unit 21 may include a vacuum suction member. In this case, the vacuum suction member may make contact with the remaining chemical liquid 19 whereas the vacuum suction member may not contact the nozzle face 17.

The driving part 25 of the chemical liquid removing 21 may operate the surface tension providing part 23. For example, the driving part 25 may move the surface tension providing part 23 such that the surface tension providing part 23 may be disposed adjacent to the nozzle face 17.

In example embodiments, the surface tension providing part 23 may be disposed under the nozzle face 17 of the ink jet head 15. For example, the surface tension providing part 23 may be substantially vertically positioned with respect to the nozzle face 17. In this case, the surface tension providing part 23 may not make contact with the nozzle face 17. Further, the driving part 25 may move the surface tension providing part 23 in a vertically upward direction and a vertically downward direction relative to the nozzle face 17 of the ink jet head 15. For example, the driving part 245 may include a motor.

In example embodiments, the chemical liquid removing unit 21 may remove the chemical liquid 19 remaining on or in the nozzle face 17 in the substantially non-contact manner. Therefore, the surface tension providing part 23 may not directly contact the nozzle face 19. In this case, the control part 27 may control the driving part 25 such that the driving part 25 may move the surface tension providing part 23 under the nozzle face 17 without contacting the surface tension providing part 23 with the nozzle face 17. Therefore, the surface tension providing part 23 may remove the remaining chemical liquid from the nozzle face 17 by utilizing the predetermined surface tension in a state where the surface tension providing part 23 is not contacted with the nozzle face 17. For example, the surface tension providing part 23 may contact the remaining chemical liquid 19 on the nozzle face 17 while the surface tension providing part 23 may not directly contact the nozzle face 17. Such arrangement of the surface tension providing part 23 may be accomplished by the movement of the surface tension providing part 23 through the driving part 25 controlled by the control part 27.

In example embodiments, the nozzle face 17 of the ink jet head 15 may generally face the substrate so that the remaining chemical liquid 19 may be in a form of substantially hanging from the nozzle face 17 toward the substrate. Therefore, the surface tension providing part 23 may remove the remaining chemical liquid 19 from the nozzle face 17 by the predetermined surface tension while the surface tension providing part 23 may not directly make contact with the nozzle face 17. Here, the control 27 may precisely adjust the arrangement of the surface tension providing part 23 relative to the nozzle face 17 by controlling the movement of the driving part 25.

In some example embodiments, the driving part 25 may move the surface tension providing part 23 in a left direction and a right direction relative to the nozzle face 17. For example, the driving part 25 may place the surface tension providing part 23 under the nozzle face 17, and then the driving part 25 may move the surface tension providing part 23 in the left direction and the right direction relative to the nozzle face 17. Therefore, the surface tension providing part 23 may more effectively the remaining chemical liquid 19 from the nozzle face 17. In this case, the surface tension providing part 23 may contact the remaining chemical liquid 19 but the surface tension providing part 23 may not make contact with the nozzle face 17.

In some example embodiments, the driving part 25 may rotate the surface tension providing part 23 with respect to the nozzle face 17. Here, the driving part 25 may dispose the surface tension providing part 23 under the nozzle face 17, and then the driving part 25 may rotate the surface tension providing part 23 relative to the nozzle face 17. Similarly, the surface tension providing part 23 may contact the remaining chemical liquid 19 whereas the surface tension providing part 23 may not make contact with the nozzle face 17.

In other example embodiments, the driving part 25 may move the surface tension providing part 23 in the left direction and the right direction relative to the nozzle face 17 while the driving part 25 rotates the surface tension providing part 23 with respect to the nozzle face 17. In other words, the driving part 25 may dispose the surface tension providing part 23 under the nozzle face 17, and then the driving part 25 may move the surface tension providing part 23 in the left direction and the right direction relative to the nozzle face 17, and simultaneously may rotate the surface tension providing part 23 with respect to the nozzle face 17. Accordingly, the surface tension providing part 23 may even more effectively the remaining chemical liquid 19 from the nozzle face 17.

In other example embodiments, the driving part 25 may rotate the surface tension providing part 23 relative to the nozzle face 17, and then the driving part 25 may move the surface tension providing part 23 in the left direction and the right direction relative to the nozzle face 17. Alternatively, the driving part 25 may move the surface tension providing part 23 in the left direction and the right direction relative to the nozzle face 17, and then the driving part 25 may rotate the surface tension providing part 23 relative to the nozzle face 17.

In example embodiments, the surface tension providing part 23 may operate in a scan manner with respect to the nozzle face 17. Thus, the surface tension providing part 23 may efficiently remove the remaining chemical liquid 19 from the whole nozzle face 17.

In some example embodiments, the hydrophilicity reinforcing part 29 of the chemical liquid removing unit 21 may increase a hydrophilicity of the hydrophilicity reinforcing part 29. When the hydrophilicity of the surface tension providing part 23 increases, a contact force between the surface tension providing part 23 and the remaining chemical liquid 19 may be improved. Therefore, the remaining chemical liquid 19 may be more easily removed from the nozzle face 17. To improve the hydrophilicity of the surface tension providing part 23, the hydrophilicity reinforcing part 29 may provide an oxygen plasma coating on the surface tension providing part 23. Alternatively, the hydrophilicity reinforcing part 29 may provide a titanium oxide coating on the surface tension providing part 23.

According some example embodiments, the control part 27 may control the driving part 25 such that the driving part 25 may dispose the surface tension providing part 23 under the nozzle face 17 after the hydrophilicity reinforcing part 29 improves the hydrophilicity of the surface tension providing part 23. Hence, the remaining chemical liquid 19 may be more efficiently removed from the nozzle face 17. Similarly, after the hydrophilicity reinforcing part 29 increases the hydrophilicity of the surface tension providing part 23, the driving part 25 may move the surface tension providing part 23 in the left direction and the right direction and/or may rotate the surface tension providing part 23.

In example embodiments, the device for supplying a chemical liquid 100 may include at least one chemical liquid removing unit 21. For example, the device for supplying a chemical liquid 100 may include one chemical liquid removing unit 21 disposed adjacent to one side of the printing unit 11. Alternatively, the device for supplying a chemical liquid 100 may include two chemical liquid removing units 21 disposed adjacent to both sides of the printing unit 11. However, the example embodiments of the invention are not limited thereto.

In some example embodiments, the chemical liquid removing unit 21 may be disposed away from the printing unit 11 by a predetermined distance, and the chemical liquid removing unit 21 may move toward the printing unit 11 when the remaining chemical liquid 19 is removed from the nozzle face 17.

As described above, the chemical liquid removing unit 21 may effectively remove the remaining chemical liquid 19 from the ink jet head 15, and also may efficiently perform the maintenance process about the printing unit 11. The device for supplying a chemical liquid 100 including the chemical liquid removing unit 21 may be advantageously employed in manufacturing of the display device such as the organic light emitting display device, a quantum dot light emitting display device, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A chemical liquid removing unit for removing a remaining chemical liquid from an ink jet head, which comprises:

a surface tension providing part configured to remove the remaining chemical liquid from a nozzle face of the ink jet head using a surface tension;

a driving part configured to move the surface tension providing part relative to the nozzle face the ink jet head; and a control part configured to control the driving part such that the surface tension providing part contacts the remaining chemical liquid whereas the surface tension providing part does not contact the nozzle face of the ink jet head, hydrophilicity reinforcing structure configured to provide an oxygen plasma coating to the surface tension providing part or to provide a titanium oxide coating to the surface tension providing part.

2. The chemical liquid removing unit of claim 1, wherein the driving part is configured to move the surface tension providing part in a vertical upward direction toward the nozzle face and move the surface tension providing part in a vertical downward direction away from the nozzle face.

3. The chemical liquid removing unit of claim 1, wherein the driving part is configured to move the surface tension providing part in a left direction and in a right direction relative to the nozzle face, and the control part controls the driving part such that the driving part moves to the surface tension providing part along the left direction and the right direction in a state where the surface tension providing part is positioned under the nozzle face.

4. The chemical liquid removing unit of claim 1, wherein the driving part is configured to rotate the surface tension providing part relative to the nozzle face, and the control part controls the driving part such that the driving part rotates the surface tension providing part in a state where the surface tension providing part is positioned under the nozzle face.

5. The chemical liquid removing unit of claim 1, further comprising:

the hydrophilicity reinforcing structure configured to increase a hydrophilicity of the surface tension providing part.

6. The chemical liquid removing unit of claim 5, the control part is configured to control the driving part such that the surface tension providing part is positioned under the nozzle face after the hydrophilicity reinforcing structure increases the hydrophilicity of the surface tension providing part.

7. A method of removing a remaining chemical liquid from an ink jet head, which comprises:

disposing a surface tension providing part under a nozzle face of the ink jet head;

removing the remaining chemical liquid from the nozzle face of the ink jet head; and, increasing the hydrophilicity of a hydrophilicity reinforcing structure wherein the surface tension providing part is placed under the nozzle face after the hydrophilicity of the hydrophilicity reinforcing structure is increased, wherein the surface tension providing part contacts the remaining chemical liquid whereas the surface tension providing part does not contact the nozzle face of the ink jet head, wherein the increasing of the hydrophilicity of the hydrophilicity reinforcing structure comprises providing an oxygen plasma coating or a titanium oxide coating on the surface tension providing part.

8. The method of claim 7, further comprising moving the surface tension providing part in a left direction or a right direction relative to the nozzle face.

9. The method of claim 7, further comprising rotating the surface tension providing part relative to the nozzle face.

10. A device for supplying a chemical liquid, comprising:

a printing unit including an ink jet head configured to provide a chemical liquid onto a substrate; and at least one chemical liquid removing unit configured to remove a remaining chemical liquid from the ink jet head, and the at least one chemical liquid removing unit comprises:

a surface tension providing part configured to remove the remaining chemical liquid from a nozzle face of the ink jet head using a surface tension;

a driving part configured to move the surface tension providing part relative to the nozzle face the ink jet head;

a control part configured to control the driving part such that the surface tension providing part contacts the remaining chemical liquid whereas the surface tension providing part does not contact the nozzle face of the ink jet head; and a hydrophilicity reinforcing structure configured to increase a hydrophilicity of the surface tension providing part, wherein the hydrophilicity reinforcing structure is configured to provide an oxygen plasma coating to the surface tension providing part or to provide a titanium oxide coating to the surface tension providing part.

11. The device for supplying a chemical liquid of claim 10, wherein the for supplying a chemical liquid comprises one chemical liquid removing unit disposed adjacent to one side of the printing unit, or two chemical liquid removing units disposed adjacent to both sides of the printing unit.

12. The device for supplying a chemical liquid of claim 10, wherein the driving part is configured to move the surface tension providing part in a vertical upward direction toward the nozzle face and move the surface tension providing part in a vertical downward direction away from the nozzle face.

13. The device for supplying a chemical liquid of claim 10, wherein the driving part is configured to move the surface tension providing part in a left direction and in a right direction relative to the nozzle face, and the control part controls the driving part such that the driving part moves to the surface tension providing part along the left direction and the right direction in a state where the surface tension providing part is positioned under the nozzle face.

14. The device for supplying a chemical liquid of claim 10, wherein the driving part is configured to rotate the surface tension providing part relative to the nozzle face, and the control part controls the driving part such that the driving part rotates the surface tension providing part in a state where the surface tension providing part is positioned under the nozzle face.

15. The device for supplying a chemical liquid of claim 10, wherein the control part is configured to control the driving part such that the surface tension providing part is positioned under the nozzle face after the hydrophilicity reinforcing structure increases the hydrophilicity of the surface tension providing part.

* * * * *